United States Patent
Chudoba et al.

[11] Patent Number: 6,095,694
[45] Date of Patent: Aug. 1, 2000

[54] FIBER OPTIC COMPONENT COUPLING APPARATUS WITH LOCKING CAPABILITY AND METHODS OF FABRICATION AND USE THEREOF

[75] Inventors: Paul Chudoba, Shohola; Jerome Polizzi, Morrisville, both of Pa.

[73] Assignee: Nuvisions International, Inc., Shohola, Pa.

[21] Appl. No.: 09/074,696

[22] Filed: May 11, 1998

[51] Int. Cl.[7] .................................................. G02B 6/38
[52] U.S. Cl. .................................................. 385/62; 385/66
[58] Field of Search .................... 385/62, 56–66, 385/68, 78, 70, 72, 92, 93, 94

[56] References Cited

U.S. PATENT DOCUMENTS

| | | | |
|---|---|---|---|
| 3,922,064 | 11/1975 | Clark et al. | 350/96.22 |
| 4,878,730 | 11/1989 | Wall | 385/140 |
| 4,934,785 | 6/1990 | Mathis et al. | 350/96.21 |
| 5,432,879 | 7/1995 | Lee | 385/60 |
| 5,563,978 | 10/1996 | Kawahara et al. | 385/136 |
| 5,594,826 | 1/1997 | Wood et al. | 385/88 |

*Primary Examiner*—Hung N. Ngo
*Attorney, Agent, or Firm*—George R. McGuire; Hancock & Estabrook, LLP

[57] ABSTRACT

Apparatus for frictionally engaging and supporting a cylindrical, fiber optic component such as an axial ferrule is provided with the capability of releasably locking the component in the apparatus, thereby permitting coupling of the component for extended periods of time without degradation of light transmission. The apparatus includes a cylindrical, split spring bushing positioned in a cavity defined by a two-part housing and a set screw in a threaded bore extending radially through overlapped portions of both housing parts. The screw is advanced into contact with the bushing to apply inwardly radial pressure thereto, increasing the frictional engagement of the bushing with the component to essentially lock the component in the apparatus. In a preferred method of fabrication and use of the apparatus, the two housing parts are placed in fully assembled condition, without the bushing, and a radial bore is formed through the overlapped portions. The housing parts are then disassembled, the diameter of the bore portion in the outer part is enlarged and the bore portion of the inner part is tapped to provide internal threads. Both parts are then deburred and reassembled with the bushing in the cavity and the set screw in the threaded portion of the radial bore.

18 Claims, 1 Drawing Sheet

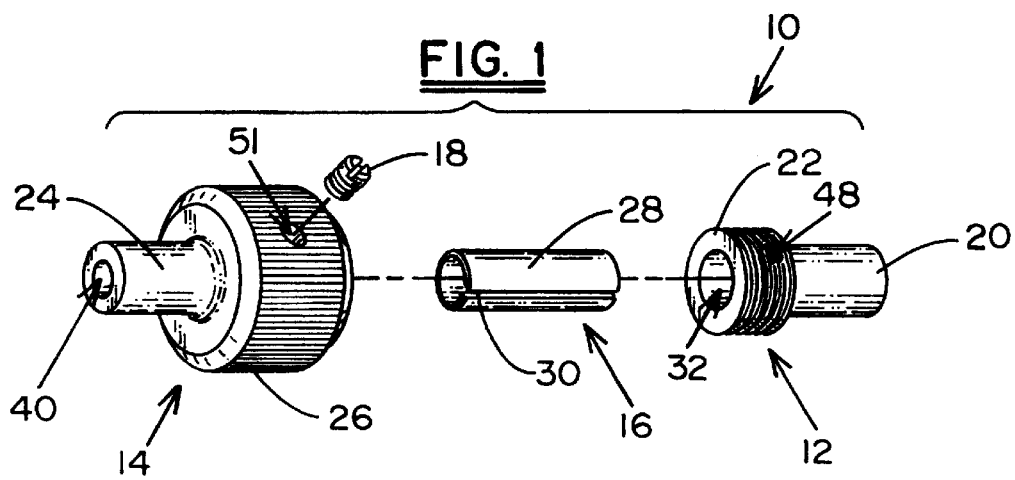
FIG. 1
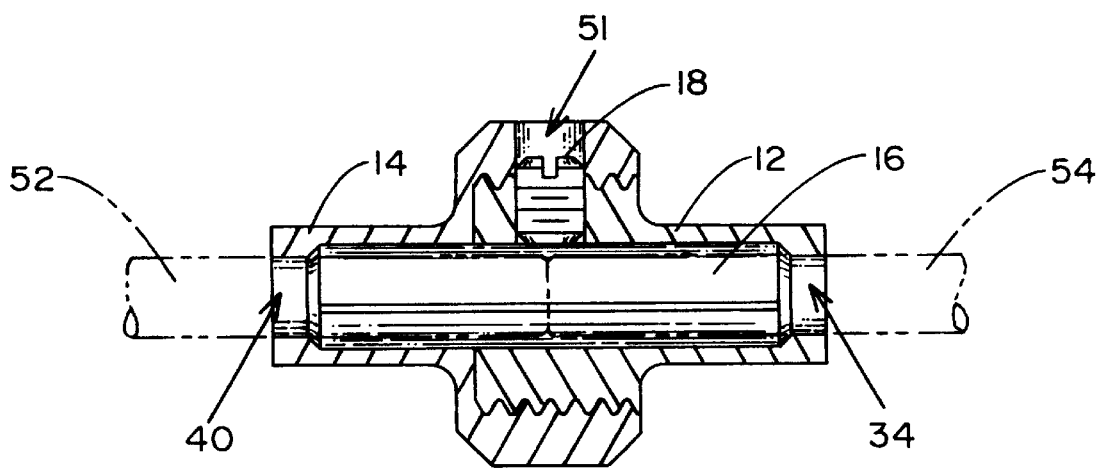
FIG. 2
FIG. 3

FIBER OPTIC COMPONENT COUPLING APPARATUS WITH LOCKING CAPABILITY AND METHODS OF FABRICATION AND USE THEREOF

BACKGROUND OF THE INVENTION

The present invention relates to coupling devices for supporting fiber optic components in predetermined relationship and to methods of fabricating and using such devices. More specifically, the invention relates to improvements in coupling devices of the type disclosed in U.S. Patent No. 5,751,874, issued May 12, 1998 and commonly assigned with the present application.

The above-referenced patent, which is incorporated herein by reference, discloses a number of embodiments of coupling devices for supporting fiber optic components in axially aligned relation. The industry-standard components, such as fiber-containing ferrules, are frictionally engaged in a split-sleeve bushing positioned within a cavity formed within two releasably engaged parts of the coupling device. In some embodiments, the device may frictionally support a pair of axial ferrules with the fibers thereof aligned with one another, with or without attenuation, while other embodiments include portions adapted for engagement with test equipment to support a ferrule in axially aligned relation with a light emitting or receiving port on the equipment. The device is extremely versatile, in that it may be used to couple axial ferrules of conventional optical fiber connectors of any of ST, FC, or SC types.

Although such coupling devices operate effectively to support components in the desired manner, it is possible that relative movement of the supported components may occur, particularly if the coupling is left in place over a relatively long time period. This may result in severe distortion of the light, a condition commonly referred to as "back reflection." Thus, in some circumstances, the coupling devices do not effectively serve their intended purpose.

It is a principal object of the present invention to provide fiber optic coupling devices which maintain a pair of fiber optic components in axially aligned relation for extended periods of time without degradation of the quality of light transmission between the components.

Another object is to provide novel and improved means for supporting fiber optic components in a desired relative relationship with means for essentially locking the components in place until released.

A further object is to provide a method of fabricating elements of a fiber optic coupling device and assembling such elements in a series of steps which ensures accuracy of operation and alignment of parts over repeated uses.

Other objects will in part be obvious and will in part appear hereinafter.

SUMMARY OF THE INVENTION

The coupling device of the aforementioned patent comprises three basic parts, termed a main body, an end cap and a split sleeve bushing. The main body and end cap are placed in mutually assembled relation, either threaded or snap fit, with the bushing captured in an internal cavity having portions defined by both the main body and end cap. Axial bores in both parts communicate with opposite ends of the bushing. The diameters of the bores and bushing are such that an industry-standard axial ferrule may be inserted through either bore and frictionally engaged by the bushing, which is radially expanded.

The coupling device of the present invention includes the same three parts which may be of the same configuration and dimensions as the corresponding parts of the referenced patent. In addition, a radial bore is formed through portions of both the main body and end cap. That is,. the axis of this bore is perpendicular to the longitudinal axes of the cavity and the axial bores communicating therewith. When the main body and end cap are assembled, the radial bores therein are axially aligned, thus forming a continuous bore extending from the exterior of the device to an intermediate position within the cavity. The radial bore of the main body is threaded to accept a set screw which may be advanced to bear against the bushing within the cavity. Thus, when fiber optic components are inserted axially into opposite ends of the bushing, the set screw is advanced to apply inward, radial pressure to the bushing, increasing frictional engagement thereof with the components, essentially locking the latter in aligned relation until the set screw is retracted to permit withdrawal of the components.

According to the preferred method of fabrication and assembly of the device, the main body and end cap are separately fabricated as in the prior patent. They are then mutually assembled and the radial bore is drilled continuously through both parts. The parts are then disassembled, the bore in the end cap is drilled to a slightly larger diameter, the radial bore in the main body is tapped to provide internal threads, and both parts are deburred. The split sleeve bushing is then positioned in the cavity cooperatively formed in the two parts, which are reassembled and the set screw advanced into the threaded, radial bore of the main body. After fiber optic components are inserted into and frictionally engaged by the bushing, the set screw is advanced to releasably lock the components in place.

The foregoing and other features of the device and method of the invention will be more readily understood and fully appreciated from the following detailed disclosure, taken in conjunction with the accompanying drawings.

BRIEF DESCRIPTION OF THE DRAWINGS

FIG. 1 is an exploded perspective view of the basic parts of the coupling device of the invention;

FIG. 2 is a side elevational view of two of the parts of FIG. 1, shown in mutually assembled relation, in full, axial section; and FIG. 3 is a side elevational view, as in FIG. 2, showing the device fully assembled with fiber optic components inserted therein shown in phantom lines.

DETAILED DESCRIPTION

Referring now to the drawings, the coupling device is denoted generally by reference numeral 10 and includes main body 12, end cap 14, split spring bushing 16 and set screw 18. Main body 12 includes smooth cylindrical portion 20 and externally threaded cylindrical portion 22. End cap 14 includes cylindrical portions 24 and 26. Bushing 16 consists of a cylindrical wall 28, divided by axial slit 30 extending the length thereof; wall 28 is of a material and thickness permitting radial expansion by an inserted object with the wall returning to its original diameter upon removal of the object.

As seen in FIG. 2, main body 12 has a through, axial bore with larger and smaller diameter portions 32 and 34, respectively, separated by shoulder 36. End cap 14 also has a through, axial bore with larger and smaller diameter portions 38 and 40, respectively, separated by shoulder 42, and a third, internally threaded portion 44 separated from portion 38 by shoulder 46. Bore portions 32 and 34 are equal in diameter to bore portions 38 and 40, respectively, and the diameters of main body portion 22 and end cap bore 44 are equal for mutual, threaded engagement of the two parts with the longitudinal axes X—X thereof aligned. When so assembled, bore portions 32 and 38 cooperatively form an internal cavity sized to receive bushing 16, the cavity being of slightly larger diameter than the bushing to accommodate some radial expansion of the bushing upon insertion of a fiber optic component therein.

The features of main body 12, end cap 14 and bushing 16 thus far described are identical to the first disclosed embodiment of the coupling device of the referenced patent. These parts are separately fabricated by conventional techniques, as in the prior patent, with the threads on the main body and end cap being such that the parts may be threadedly engaged with main body 12 bottoming out against shoulder 46 when fully assembled, as in FIG. 2. In the preferred method of fabrication. of the present coupling device, after main body 12 and end cap 14 are separately formed and fully assembled, the overlapped, threaded portions thereof are drilled in a continuous operation, forming axially aligned, common diameter bores 48 and 50 in main body 12 and end cap 14, respectively. The common axes of bores 48 and 50 are perpendicular to axes X—X; i. e., bores 48 and 50 extend radially of axially aligned parts 12 and 14.

Parts 12 and 14 are then disassembled. Bore 50 is drilled to a slightly larger diameter, indicated in FIGS. 1 and 3 by reference numeral 51, and bore 48 is tapped to provide internal threads. Both parts are then deburred and reassembled with bushing 16 positioned in the cavity formed by bores 32 and 38. Set screw 18 is inserted through bore 51 and threadedly advanced into bores threaded bore 48 without exerting significant pressure on bushing 16. Fiber optic components, such as the axial ferrules shown in phantom lines in FIG. 3 and denoted by reference numerals 52 and 54, are then inserted into bores 34 and 40 and frictionally engaged by bushing 16. Set screw 18 is then advanced to exert pressure on bushing 16, thereby increasing the frictional engagement of the bushing with ferrules 52 and 54, essentially locking the ferrules in position until the set screw is retracted to remove the pressure and permit easy withdrawal of the ferrules.

The optical fibers carried by the ferrules, or other components such as discussed in the referenced patent, will remain in alignment without degradation of optical transmission over extended periods when secured in the manner described. Drilling of bores 48 and 50 while the main body and end cap are assembled and the main body in fully threaded engagement with the end cap ensures that bores 51 and 48 will be properly aligned upon each reassembly of the parts. Although no specific means has been disclosed, it is apparent that, if desired, means may be provided to limit the extent of advancement of the set screw in order to avoid exerting excessive force on, and possible damage to, the bushing and coupled components. It should also be noted that the invention may be employed in connection with any of the embodiments disclosed in the referenced patent, including those wherein a fiber optic device is inserted into only one end of the device and the option of axially spacing the components to provide controlled attenuation, the drawings and descriptions of the present application being limited for purposes of brevity and simplicity to the threadedly engaged main body and end cap embodiment.

What is claimed is:

1. Apparatus for supporting at least one cylindrical fiber optic component of predetermined diameter in a predetermined position, said apparatus comprising:

a) a cylindrical sleeve having at least one open end and an inside diameter permitting axial insertion of said component into said one end with said sleeve frictionally engaging said component;

b) at least first and second members threadably engaged with one another, together defining a cavity in which said sleeve is removably enclosed without obstructing said open end; and c) means for releasably locking said component in said sleeve.

2. The apparatus of claim 1 wherein said sleeve is a split spring bushing having an axial slot running the length thereof to permit radial expansion as said component is inserted.

3. The apparatus of claim 2 wherein said locking means comprises means for applying an inwardly radial force on the exterior of said sleeve, thereby increasing said frictional engagement of said sleeve with said component.

4. The apparatus of claim 3 wherein said means for applying a radial force comprise at least one set screw.

5. The apparatus of claim 4 and further including a threaded bore in said housing means, said set screw being threadedly engaged with said bore for advancement therein to apply said radial force.

6. The apparatus of claim 1 wherein said housing means is so configured that the axial ferrule of any of ST, FC, or SC type fiber optic connectors may be inserted into said sleeve.

7. The apparatus of claim 1 wherein said two members include overlapping portions which are intersected by an axis extending radially of said cavity, and further including a bore extending continuously through said portions along said axis, and said locking means comprise means extending through said bore and engaging said sleeve.

8. The apparatus of claim 7 wherein at least a portion of said bore is threaded and said locking means comprises a set screw threadedly engaged in said bore for advancement into engagement with said sleeve.

9. The apparatus of claim 8 said bore is threaded in only one of said portions.

10. The method of fabricating and employing apparatus for supporting a cylindrical fiber optic component of predetermined diameter, said apparatus comprising a cylindrical, split spring bushing having at least one open end and a diameter slightly less than said predetermined diameter, and housing means cooperatively formed by at least two separable parts and defining a cavity enclosing said bushing without obstructing said open end, said method comprising:

a) forming a through bore in at least one of said two parts communicating between the exterior of said housing means and said cavity in alignment with a portion of said bushing;

b) inserting said component into said open end for frictional engagement by said bushing; and c) inserting an object through said bore to contact and exert inward, radial pressure on said bushing, thereby increasing the frictional engagement thereof with said component.

11. The method of claim 10 wherein said bore is at least partly threaded and said object is a set screw threadedly engaged in said bore.

12. The method of claim 11 wherein said bore has a central axis perpendicular to the longitudinal axis of said cylindrical bushing.

13. The method of claim 12 wherein said two parts are formed for selective movement between fully assembled and disassembled positions, and include respective portions which are overlapped and intersected by said central axis when in said fully assembled position.

14. The method of claim 13 wherein said bore is formed to extend through both of said respective portions while said parts are in said fully assembled position, and prior to placing said bushing in said cavity.

15. The method of claim 14 and further including moving said parts to said disassembled position after forming said bore and enlarging the diameter of the portion of said bore in one of said parts while said parts are in said disassembled position.

16. The method of claim 15 and further including forming said threads in the portion of said bore in the other of said parts while said parts are in said disassembled position.

17. The method of claim 16 and further including deburring both of said parts while said parts are in said disassembled position and thereafter placing said parts in said fully assembled position with said bushing in said cavity and said set screw in said threaded portion of said bore.

18. The method of claim 17 wherein said two parts are formed for mutual threaded engagement and disengagement in moving between said fully assembled and disassembled positions, respectively.

* * * * *